US006994899B2

(12) United States Patent
McClelland et al.

(10) Patent No.: US 6,994,899 B2

(45) **Date of Patent: *Feb. 7, 2006**

(54) CURL RESISTANT SINGLE SUBSTRATE LABEL SHEET AND A METHOD FOR MAKING SAME

(75) Inventors: Leslie E. McClelland, Lancaster, OH (US); Chad Stephenson, Somerset, OH (US)

(73) Assignee: The Cyril-Scott Company, Lancaster, OH (US)

( * ) Notice: Subject to any disclaimer, the term of this patent is extended or adjusted under 35 U.S.C. 154(b) by 130 days.

This patent is subject to a terminal disclaimer.

(21) Appl. No.: 10/665,039

(22) Filed: Sep. 18, 2003

(65) Prior Publication Data

US 2004/0191455 A1 Sep. 30, 2004

Related U.S. Application Data

(63) Continuation-in-part of application No. 10/397,399, filed on Mar. 26, 2003.

(51) Int. Cl.
*B32B 9/00* (2006.01)

(52) U.S. Cl. ...................... 428/40.1; 283/81; 428/41.6; 428/41.9; 428/42.1; 428/42.2; 428/42.3; 428/43

(58) Field of Classification Search ............... 428/40.1, 428/41.6, 41.9, 42.1, 42.2, 42.3, 43; 283/81
See application file for complete search history.

(56) References Cited

U.S. PATENT DOCUMENTS

| | | | | |
|---|---|---|---|---|
| 4,110,502 | A * | 8/1978 | Baer | 428/42.1 |
| 5,041,072 | A | 8/1991 | McClelland | |
| 5,642,906 | A | 7/1997 | Foote et al. | |
| 5,855,395 | A | 1/1999 | Foote et al. | |
| 6,036,231 | A | 3/2000 | Foote et al. | |
| 6,189,936 | B1 | 2/2001 | Erber et al. | |
| 6,254,952 | B1 | 7/2001 | Fox et al. | |
| 6,304,849 | B1 | 10/2001 | Uecker et al. | |
| 6,368,688 | B1 | 4/2002 | Crum et al. | |
| 6,410,111 | B1 | 6/2002 | Roth et al. | |
| 2003/0015868 | A1 | 1/2003 | Jarvis et al. | |

* cited by examiner

*Primary Examiner*—Nasser Ahmad
(74) *Attorney, Agent, or Firm*—Gallagher & Dawsey Co., LPA; Michael J. Gallagher; David J. Dawsey

(57) ABSTRACT

A curl resistant single substrate label sheet, and in-line high speed method for making same, for use with conventional printers, including at least one body portion, at least one label portion, and at least one release liner portion, all of which are made of a common substrate permitting the use of the label sheet with conventional printers including off the shelf laser printers, including duplex printers. The label portion may include multiple individual labels that may extend all the way to the edges of the label sheet. The label sheet may contain printed indicia on all portions of the label sheet and permit the end user to print on all exposed surfaces. The label sheet may include at least one score across the grain of the substrate to increase the rigidity of the label and further prevent curling.

24 Claims, 6 Drawing Sheets

CURL RESISTANT SINGLE SUBSTRATE LABEL SHEET AND A METHOD FOR MAKING SAME

This is a continuation-in-part of application Ser. No. 10/397,399, filed Mar. 26, 2003.

TECHNICAL FIELD

The present invention relates to the field of laminated label sheets, and more specifically, to single substrate curl resistant label sheets for use with conventional laser printers, and a method for making the same.

BACKGROUND OF THE INVENTION

Label sheets are commonly available in a number of configurations for use with any number of printers. The most common type of label sheets are laminates generally consisting of a paper overlay, or multiple overlays, and an underlying release liner, joined together with an adhesive.

The underlying release liner is most commonly a lightweight paper coated on at least one side with liquid silicon that is thermally cured to provide a low adhesion surface to which the overlay is releasably bonded with the adhesive. Such liners are generally pre-manufactured by others and therefore have to be separately introduced into the label sheet manufacturing process. Additionally, since such liners are generally purchased from a separate vendor they usually contain unimaginative printing, if any, and are prohibitively expensive when ordered with custom markings. The adhesive provides a bond between the overlay and the silicone liner that is generally sufficiently strong to hold the overlay and the liner together until separation is desired. Often label sheets include several individual labels cut in the overlay.

Such traditional label sheets have been plagued by many problems when used in modern printers. Most commonly, tight turning radiuses in the sheet feed path of modern printers cause premature separation of the labels from the liner in the printer resulting in expensive repair work. Additionally, exposure of the label to the heat of a fuser in a modern laser printer often results in liquefaction of the adhesive. Such liquefied adhesive may then be expelled from between the overlay and the release liner during printing causing significant damage to expensive printing equipment. Further, silicon coated release liners are virtually impossible to print on, even when they are only coated with silicon on one side. Additionally, release liners that are silicon coated on only one side tend to curl when exposed to heat often rendering the label useless. This is particularly true when the release liner does not completely cover the overlay, as is often desired. Further, embodiments having partial release liners are further plagued by increased curling problems on the portion of the label sheet that does not contain the release liner, a problem heightened when duplex laser printers are used. Lastly, silicon coated release liners are also relatively expensive and often are difficult to introduce in the label sheet making process.

Label sheets have wide ranging application. In the pharmacy industry label sheets are utilized for pharmacy scripts whereby they have numerous uniquely sized labels for application to drug containers contained in the sheet along with several detachable sections that may serve as a customer receipt, a pharmacy order copy, as well as sections directed toward informing the customer of application instructions and potential dangers, among others. As such, a pharmacy script may easily consist of well over a dozen individual areas that require application of unique printing.

Numerous attempts have been make to overcome some of these difficulties. For example, U.S. Pat. No. 6,410,111 to Roth et al. has attempted to reduce the problem of premature separation of the overlay and the liner with the use of bond areas of varying strengths. The selective application of varying release coatings and adhesive bonds requires unique equipment and processes. U.S. Pat. No. 6,254,952 to Fox et al. introduces a leading edge feed strip to reduce the potential for premature separation caused by printer rollers. The introduction of the leading edge feed strip reduces the area available for labels and increases waste.

Traditionally, label sheet manufacturers have not produced label sheets that contain individual labels that extend all the way to the edge of the sheet due to the likelihood of premature separation, discussed above, and the issue of adhesive liquefaction. Maintaining the individual labels inward from the label sheet edges permits the manufacturer to avoid application of adhesive near the edges of the label sheet. Therefore, even if liquefaction occurs during printing, the liquefied adhesive is unlikely to be expelled from the label sheet and cause damage to the printer. This adhesive setback region results in reduced area available for labels, thereby increasing waste, and has been a limitation on the sheet label industry.

Further, manufacturers of label sheets have long recognized that the end users of the label sheets desire the ability to print indicia on both sides of a curl resistant label sheet that may have preprinted indicia on the release liner front surface and the overlay's rear surface, while using an off the shelf printer. While U.S. Pat. No. 6,304,849 to Uecker et al., attempts to solve many of the problems previously discussed, it teaches the use of a preferred printer having fewer paper feed path turns of small radius than a conventional printer, and having lower fusing temperature.

The instant invention utilizes a curl resistant single substrate to create both the overlay and the release liner, thereby overcoming many of the problems of the prior art. Manufacturing a release liner of the same material as the overlay that receives a release coat, eliminates the need for expensive silicon coated release liners and their inherent problems. Additionally, the instant invention may incorporate features designed to increase the rigidity of the label sheet, thereby reducing curling and the likelihood of printer jams. Further, such construction permits the use of a web offset lithography printing process rather than traditional label printing methods, thereby significantly improving production time, waste production, color capabilities, availability of auxiliary elements such as remoist and scratch-off areas, nesting variations, and quality.

Accordingly, the art has needed a means for improving the art of label sheets designed for use with conventional off the shelf printers, including duplex printers. While some of the prior art devices attempted to improve the state of the art, none has achieved the unique and novel configurations and capabilities of the present invention. With these capabilities taken into consideration, the instant invention addresses many of the shortcomings of the prior art and offers significant benefits heretofore unavailable. Further, none of the above inventions and patents, taken either singly or in combination, is seen to describe the instant invention as claimed.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways. In one of the many preferable configurations, the curl resistant single substrate label sheet for use with conventional printers has at least one body portion, at least one label portion, and at least one release liner portion, all of which are made of a common substrate. The term conventional laser printer used throughout refers to a non-custom printer having standard fuser temperatures and standard paper feed paths, including duplex printers.

Each of the three portions previously identified has a front and a rear surface that may be printed upon. The label portion is contiguous with the body portion and has at least one heat resistant adhesive applied to at least a portion of the rear surface. Additionally, the label portion is formed to have at least one label. The release liner has at least one heat resistant release coating on at least a portion of the front surface, and is releasably bonded to the label portion by the heat resistant adhesive.

The label sheet has a plurality of edges including, in one embodiment, at least a top edge, a bottom edge, a left edge, and a right edge. The heat resistant adhesive of the present invention does not liquefy when exposed to the heat of a conventional laser printer fuser, thereby permitting the at least one label to extend all the way to at least one of the plurality of edges. As such, the label portion may include multiple labels extending to the plurality of edges thereby maximizing the usable label area and minimizing waste. Further, the label sheet may have the label portion in any location on the label sheet.

The single substrate construction of all portions of the label sheet allows the label sheet to contain printed indicia on the front and rear surfaces of all portions of the label sheet. Additionally, the single substrate design permits use in conventional laser printers. Therefore, the end user may then print on any portion of the body portion front and rear surfaces, any portion of the label portion front surface, and any portion of the release liner rear surface. Further, the unique construction and manufacturing method of the present invention permits the label sheet to further contain printed indicia on at least a portion of the label portion rear surface and at least a portion of the release liner front surface.

The label sheet of the present invention may include a number of additional variations including such elements as remoist areas; removable foil, or scratch-off, areas; lines of perforation; fold lines; and viewing windows.

The single substrate construction of the instant invention is particularly significant for a number of reasons. It allows the sheet label to be produced in a high speed in-line manufacturing method, it provides the release liner with the rigidity necessary to be coated on a single side with a release coating and not curl when printed on, it permits a release liner to accept printed indicia on either the front or rear surface during the manufacturing process, and allows the end user to apply printed indicia to the rear surface using a conventional printer.

Additional curl prevention features, such as the inclusion of at least one score in the label sheet, may be incorporated into the present invention. The inclusion of at least one score increases the rigidity of the label sheet and further increases the curl resistance of the label sheet. The at least one score is preferably across the grain of the substrate and need only compress the grain slightly to realize great curl prevention benefits. Research has shown an embodiment including a first score and a second score that extend substantially orthogonally from the bottom edge of the label sheet may reduce curl as much as 85% over conventional label sheets. The at least one score should not be continuous over the entire length of the label sheet, as continuous score lines tend to promote curling across the grain of the substrate. Research indicates that in one embodiment the preferred length of the at least one score is approximately 25% of the overall length of the label sheet, or less. Another advantage of the carefully applied at least one score of the present invention is that they substantially disappear from sight upon exposure to the heat of the conventional printer.

The high speed in-line manufacturing method used to prepare the label sheets may accept the output of a continuous web press. The method generally consists of first providing a web of substrate to the process, followed by application of a strip of release coating that is then cured in a dryer, application of a strip of heat resistant adhesive, folding the substrate back upon itself thereby releasably joining it, and lastly trimming off any excess and cutting the individual label sheets. The process may alternatively include a slit-and-merge process in lieu of the previously described folding and trimming method. Either of the previously described in-line methods may further include the step of printing any number of colors on of the web of substrate prior to applying the release coating and the step of introducing at least one score line into the substrate across the grain of the substrate.

These variations, modifications, alternatives, and alterations of the various preferred embodiments, arrangements, and configurations may be used alone or in combination with one another as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

DETAILED DESCRIPTION OF THE INVENTION

The curl resistant single substrate label sheet for use with conventional printers of the instant invention, and the method of making the same, enables a significant advance in the state of the art. The preferred embodiments of the apparatus accomplish this by new and novel arrangements of elements and methods that are configured in unique and novel ways and which demonstrate previously unavailable but preferred and desirable capabilities.

The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
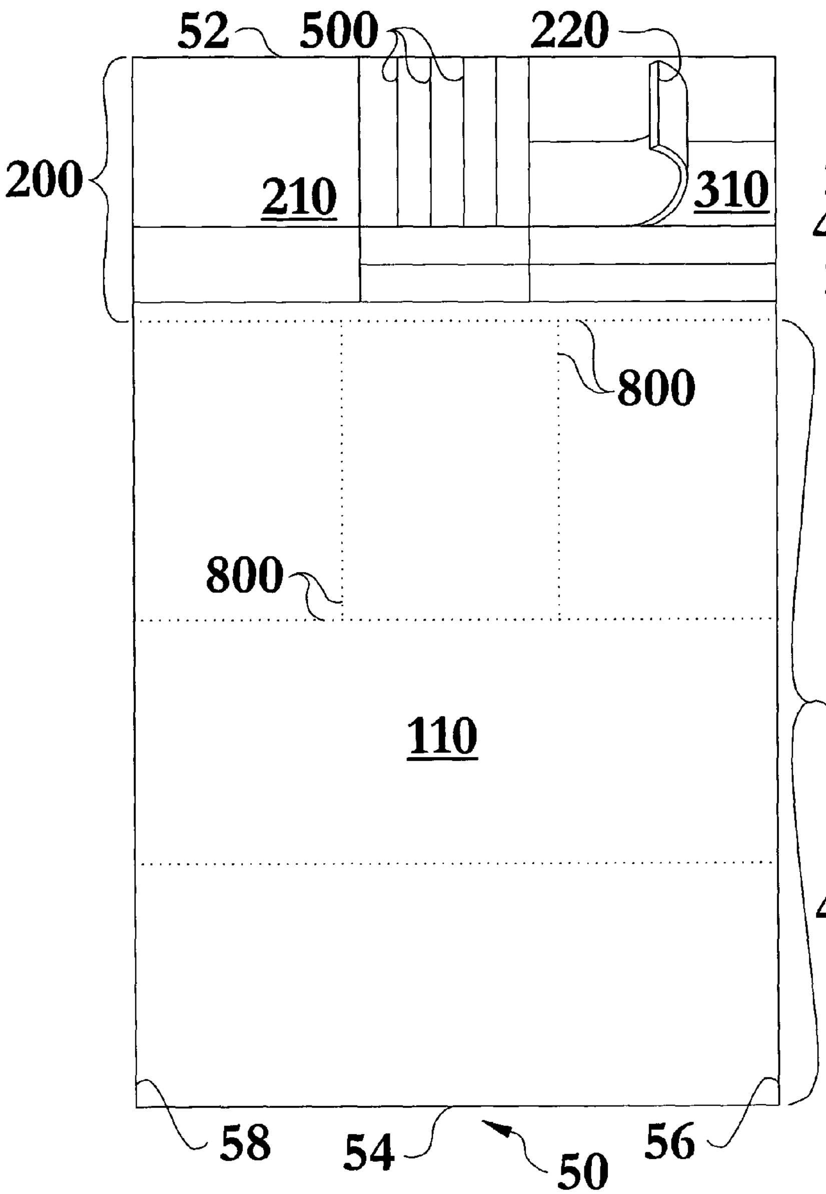
FIG. 1 shows a curl resistant single substrate label sheet in top plan view, in reduced scale.
Figure 2:
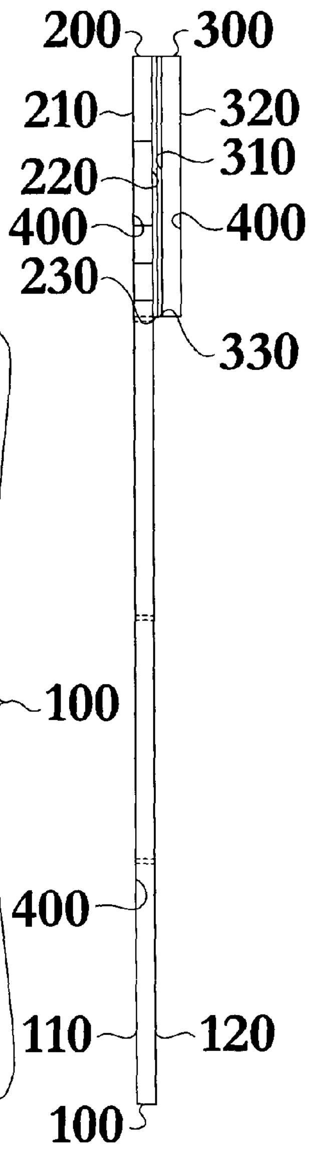
FIG. 2 shows the label sheet of FIG. 1 in right side elevation view, in reduced scale.
Figure 3:
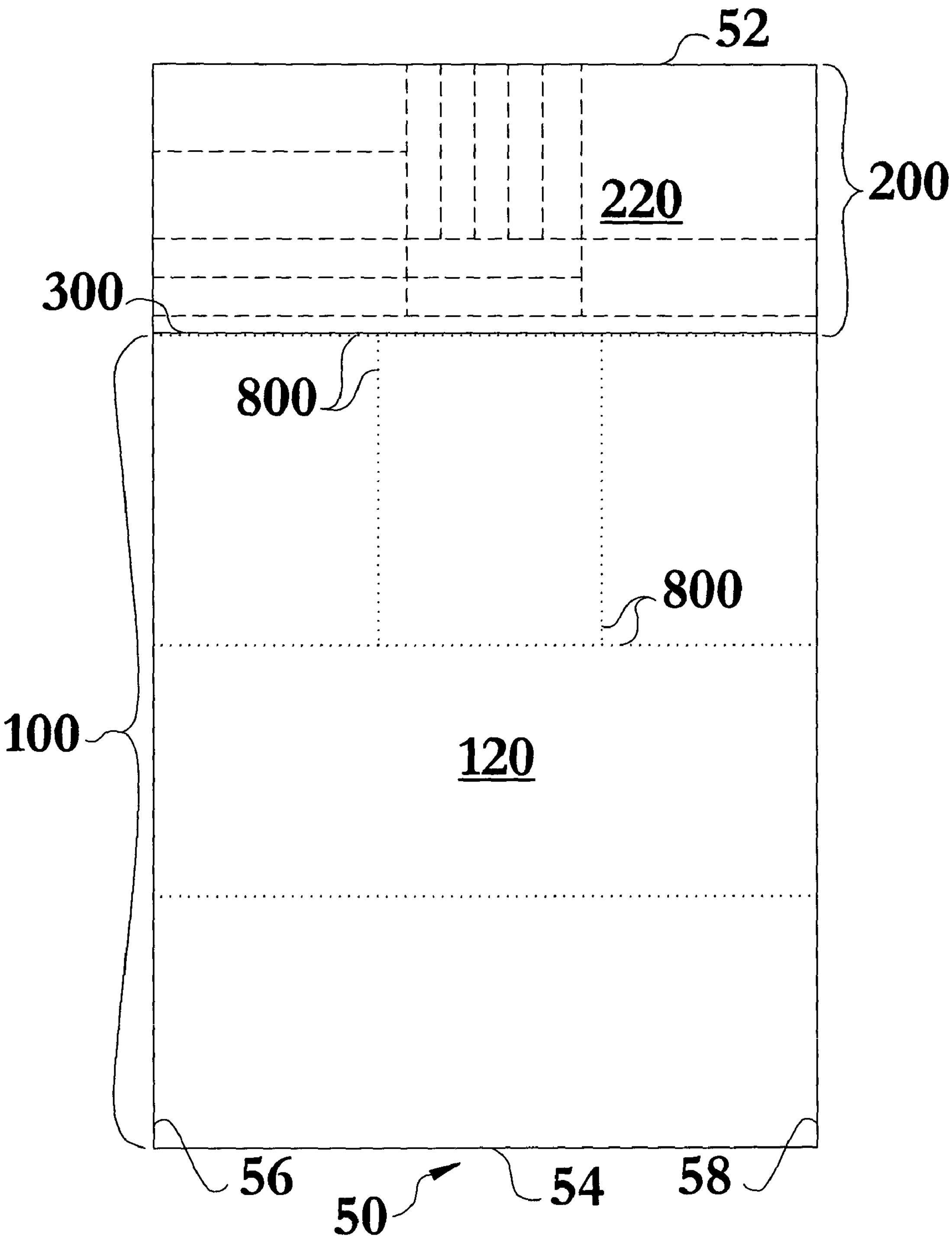
FIG. 3 shows the label sheet of FIG. 1 in rear plan view, in reduced scale.

With reference generally now to FIG. 1 through FIG. 5, the curl resistant single substrate label sheet 50 for use with conventional printers has at least one body portion 100, at least one label portion 200, and at least one release liner portion 300, all of which are made of a common substrate 400. With particular reference to FIG. 1 to FIG. 3, the at least one body portion 100 has a front surface 110 and a rear surface 120, the at least one label portion 200 has a front surface 210 and a rear surface 220, and the at least one release liner 300 has a front surface 310 and a rear surface 320. The at least one label portion 200 is contiguous with the body portion 100 and has at least one heat resistant adhesive 230 applied to at least one portion of the rear surface 220. Further, the at least one label portion 200 has at least one label 500 formed in the label portion 200. The at least one release liner 300 has at least one heat resistant release coating 330 on at least one portion of the front surface 310, and is releasably bonded to the label portion 200 by the at least one heat resistant adhesive 230. The term conventional laser printer used throughout refers to a non-custom printer having standard fuser temperatures and standard paper feed paths, including duplex printers. The common substrate 400 may include virtually any printing media, and in one preferred embodiment consists of micro optical character recognition.

The label sheet 50 has a plurality of edges including, in one embodiment, at least a top edge 52, a bottom edge 54, a left edge 58, and a right edge 56. The heat resistant adhesive 230 of the present invention does not break down when exposed to the heat of a conventional laser printer fuser, thereby permitting the at least one label 500 to extend all the way to at least one of the plurality of edges. As such, the at least one label portion 200 may include multiple labels 500 extending to the plurality of edges thereby maximizing the usable label area and minimizing waste. A further variation of the present embodiment may include the situation wherein the at least one label portion 200 is bounded on three sides by the top edge 52, the left edge 58, and the right edge 56, and substantially all of the label portion 200 is formed into the at least one label 500.

Figure 4:
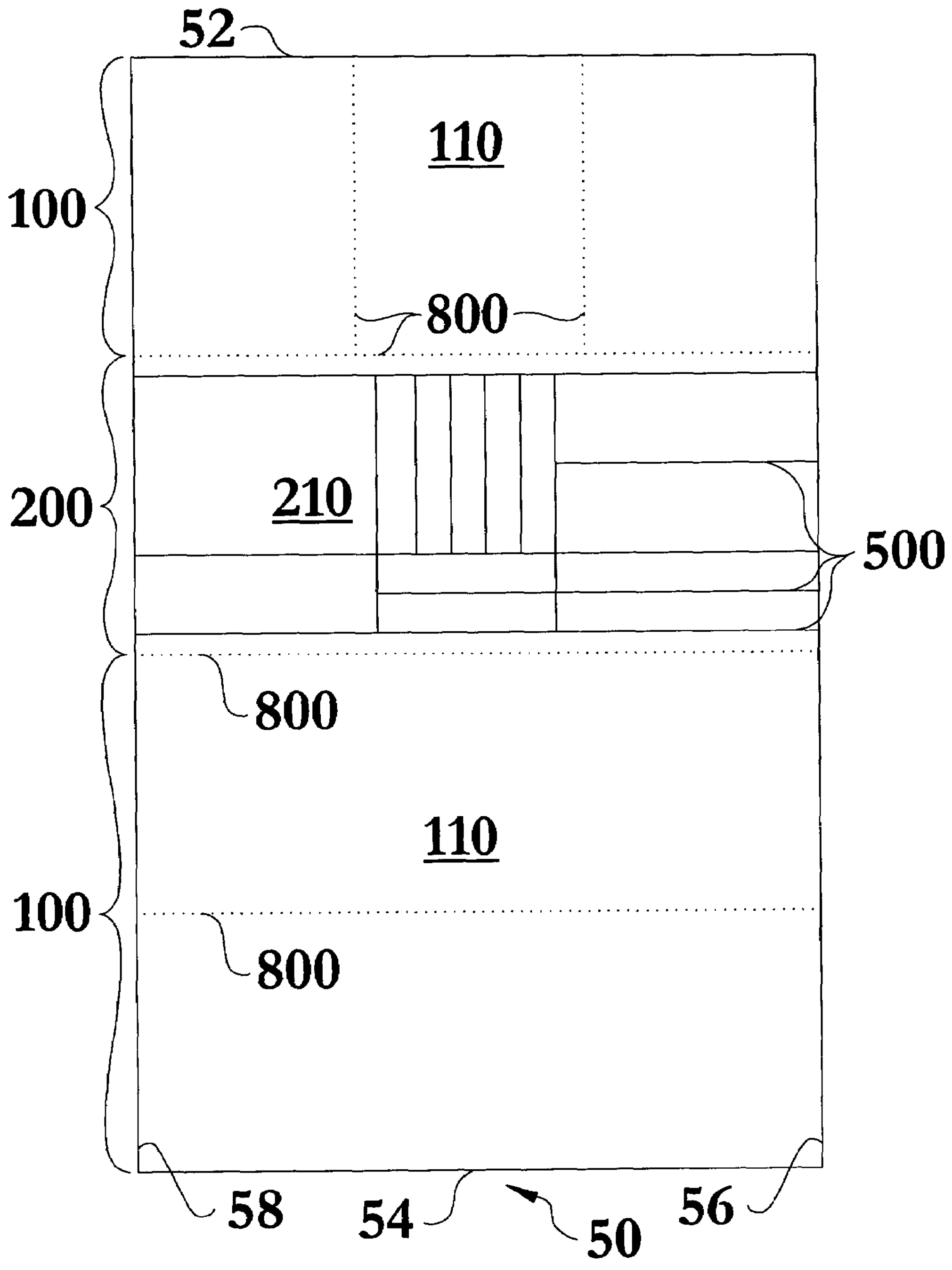
FIG. 4 shows a variation of the label sheet of FIG. 1 in top plan view, in reduced scale.

As illustrated in FIG. 4, the label sheet 50 may have the at least one label portion 200 in any location on the label sheet 50. As illustrated in FIG. 4, the at least one label portion 200 may separate two distinct body portions 100. Similarly, the label sheet 50 may include numerous label portions 200. The configurations are endless, however the configuration illustrated in FIG. 1, FIG. 2, and FIG. 3, has particular application in the pharmacy industry.

The unique application of a single substrate 400 to construct all portions of the label sheet 50 allows the label sheet 50 to contain printed indicia on at least a portion of the at least one body portion front 110 and rear surfaces 120, at least a portion of the at least one label portion front surface 210, and at least a portion of the at least one release liner rear surface 320. Therefore, the present label sheet 50 permits hidden messages or directions to be printed on the at least one release liner front surface 310 or the at least one label portion rear surface 220, that is only revealed when one of the at least one labels 500 is removed from the at least one label portion 200. Further, the single substrate 400 design permits use in conventional laser printers. Therefore, the end user may then print on any portion of the at least one body portion front 110 and rear surfaces 120, any portion of the at least one label portion front surface 210, and any portion of the at least one release liner rear surface 320. Additionally, the unique construction and manufacturing method of the present invention permits the label sheet 50 to further contain printed indicia on at least a portion of the at least one label portion rear surface 220, and at least a portion of the at least one release liner front surface 320.

Figure 5:
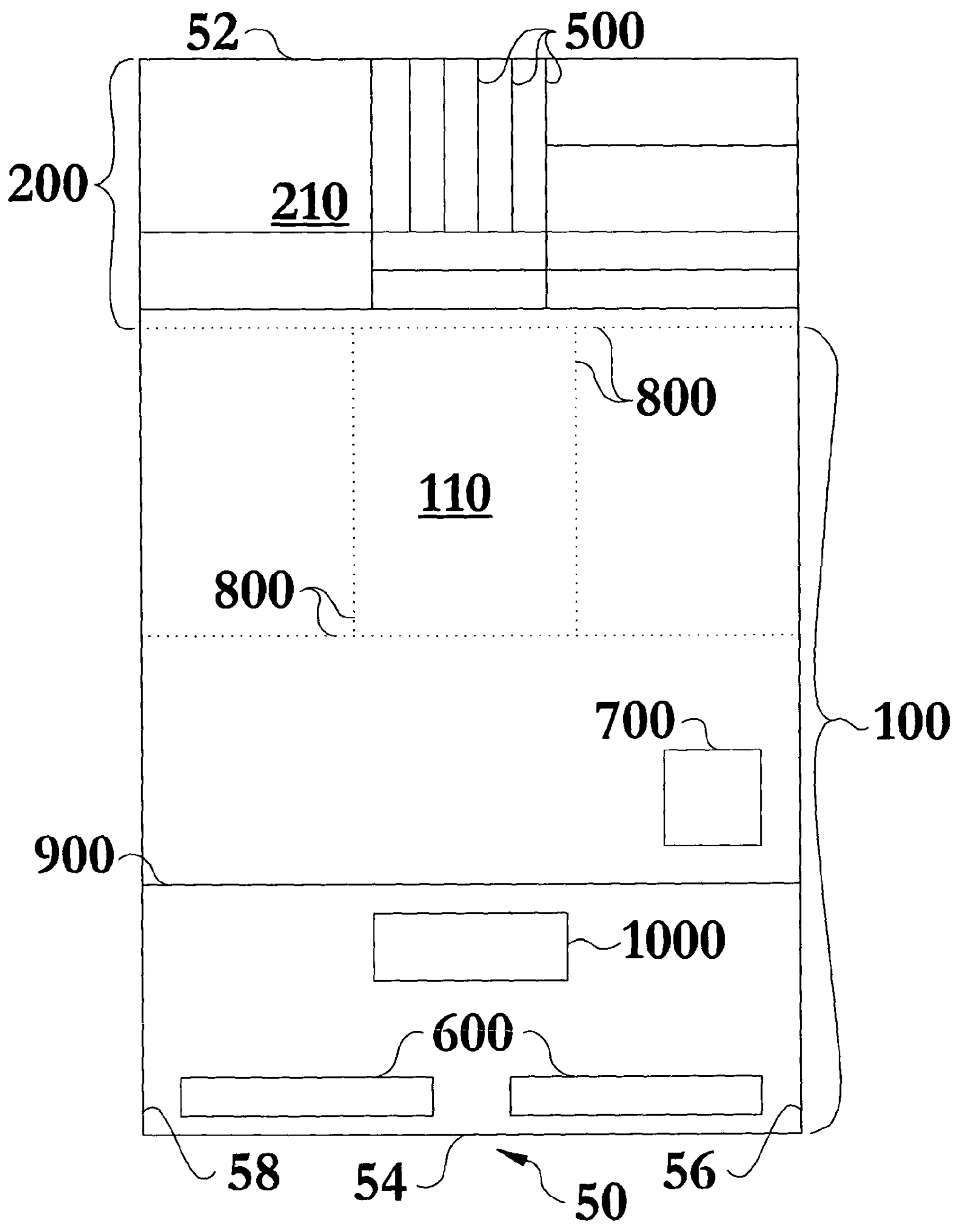
FIG. 5 shows a variation of the label sheet of FIG. 1 in top plan view, in reduced scale.

The label sheet 50 of the present invention may include a number of additional variations including such elements as at least one remoist area 600, at least one removable foil, or scratch-off, area 700, at least one line of perforation 800, at least one fold line 900, and at least one viewing window 1000, as illustrated in FIG. 5.

Figure 7:
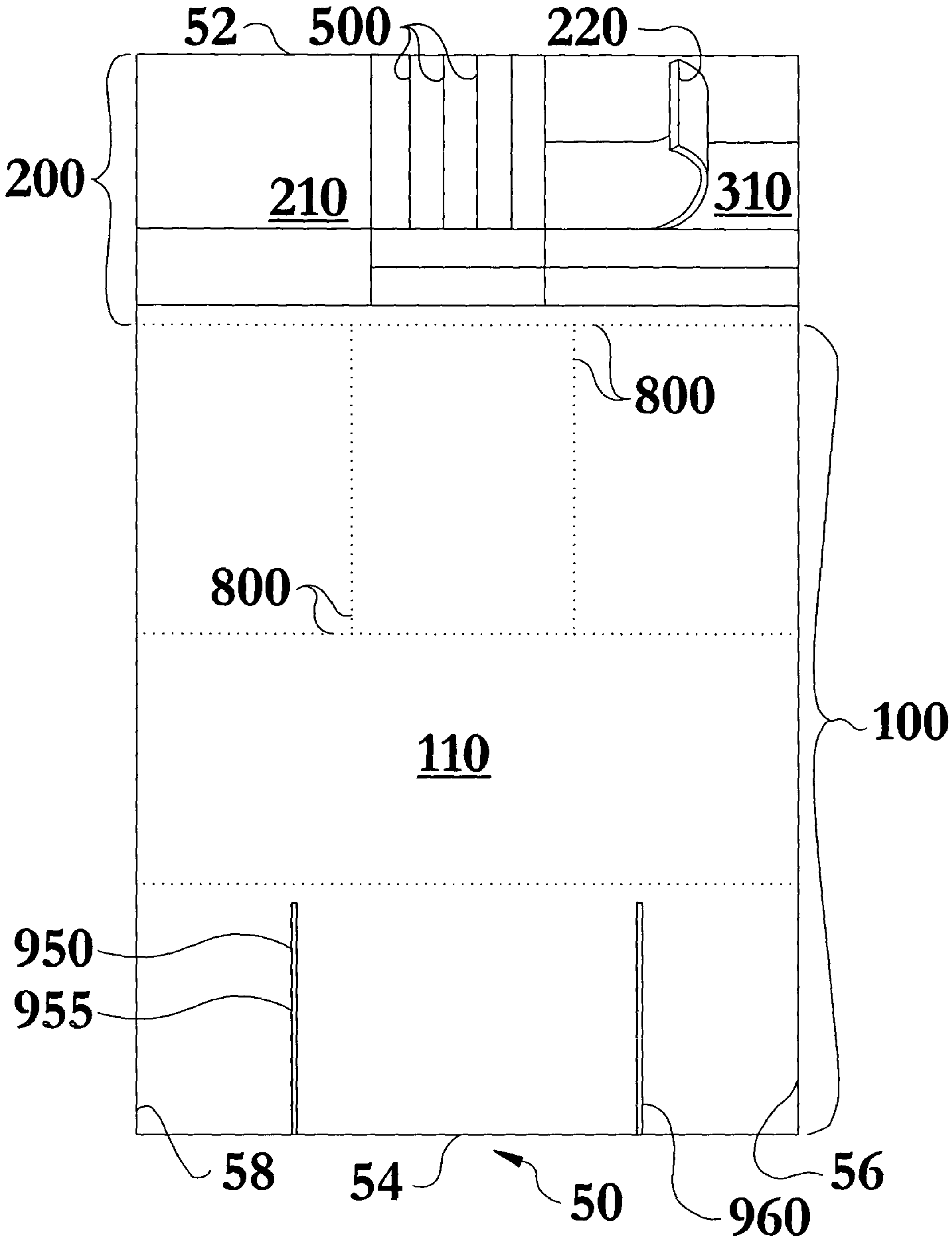
FIG. 7 shows a variation of the label sheet of FIG. 1 in top plan view, in reduced scale.

The label sheet 50 of the present invention may also include additional curl prevention features. For example, the label sheet 50 may include at least one score 950 to increase the rigidity of the label sheet 50, as seen in FIG. 7. The at least one score 950 is preferably across the grain of the substrate and need only compress the grain slightly to realize great curl prevention benefits. Research has shown that the at least one score 950 extending from the bottom edge 54, or the edge that first enters the printer, may reduce curl by as much as 85% over conventional label sheets. Additionally, one embodiment includes a first score 955 and a second score 960 extending substantially orthogonally from the bottom edge into the at least one body portion. The at least one score 950 should not be continuous over the entire length of the label sheet 50, as continuous score lines tend to promote curling across the grain of the substrate. Research indicates that in one embodiment the preferred length of the at least one score 950 is approximately 25% of the overall length of the label sheet 50, or less. Another advantage of the carefully applied at least one score 950 of the present invention is that they substantially disappear from sight upon exposure to the heat of the conventional printer.

The single substrate 400 construction of the instant invention is particularly significant for a number of reasons. It allows the sheet label 50 to be produced in a high speed in-line manufacturing method. Further, the use of a common substrate 400 for the at least one release liner 300 as is used for the at least one body portion 100 and the at least one label portion 200, provides the rigidity necessary to the at least one release liner 300 so that it may be coated on a single side with a release coating 330 and not curl when printed on with a conventional printer. Additionally, unlike prior art backing sheets and release liners, the at least one release liner 300 of the present invention may accept printed indicia on either the front surface 310 or the rear surface 320 during the manufacturing process and the end user may apply printed indicia to the rear surface 320 using a conventional printer.

Figure 6:
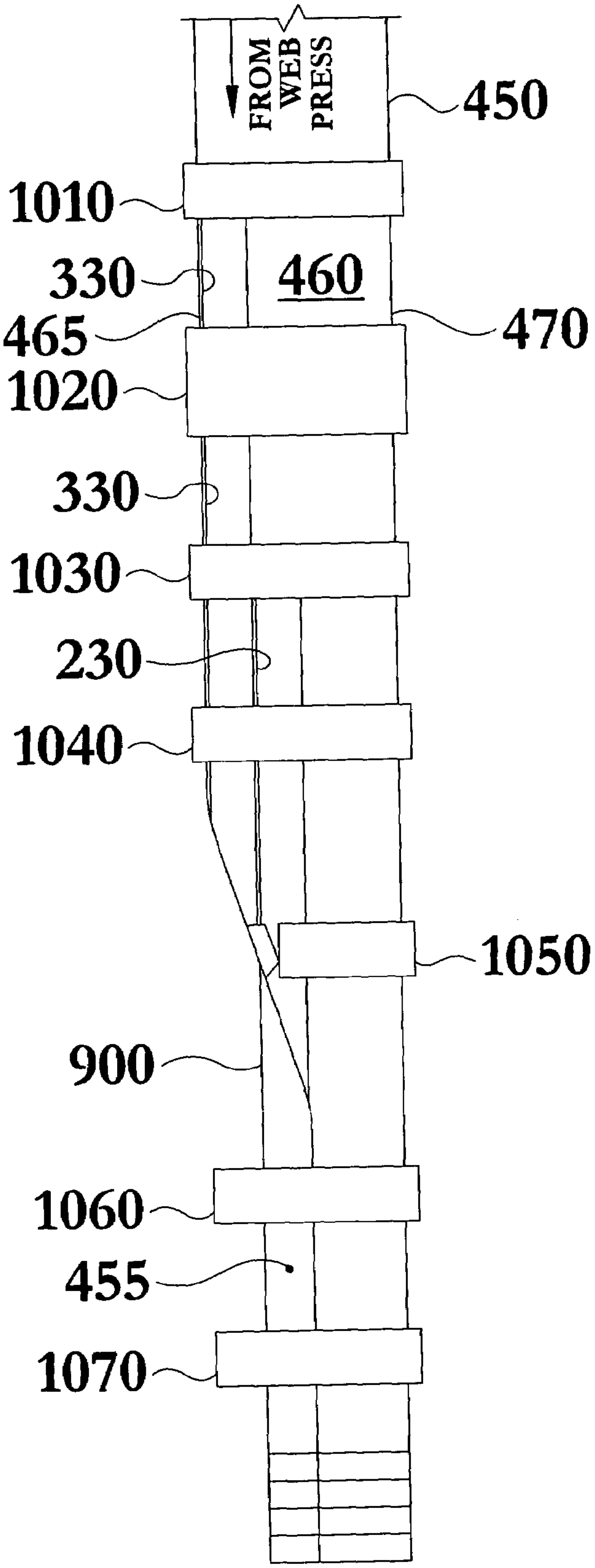
FIG. 6 shows a schematic of the in-line production method of the label sheet of FIG. 1, in reduced scale.

The high speed in-line manufacturing method previously eluded to is illustrated in FIG. 6. The first step in the method consists of providing a web of substrate 450, in a longitudinal direction, of indeterminate length having a front surface 455 and a rear surface 460 and two laterally opposite edges 465, 470. The web of substrate 450 may be supplied directly from a web printing process to this in-line manufacturing method. Next, a strip of release coating 330 is applied to at least a portion of the rear surface 460 of the substrate by the release coat applicator 1010 and is then cured in a dryer 1020. A strip of heat resistant adhesive 230 is then applied to at least a portion of the rear surface 460 of the substrate by the adhesive applicator 1030, as shown in FIG. 6, or to the strip of release coating 330. The folder 1050 then folds the web of substrate 450 longitudinally along a fold line 900 thereby releasably joining a plurality of portions of the rear surface 460, and the fold line 900 is trimmed from the web of substrate 450 via the diecutter 1060. The diecutter 1060 may additionally trim all the edges of the web of substrate 450. Lastly, the cutoff station 1070 cuts the web of substrate 450 into a succession of separate curl resistant single substrate label sheets 50. Alternatively, the in-line manufacturing method may use a slit-and-merge process in lieu of the previously described folding and trimming method. For instance, the slitter 1040 may slice the web of substrate 450 longitudinally along a cut line thereby creating a plurality of sections of the web of substrate 450. The plurality of sections of the web of substrate may then be merged longitudinally about the cut line via the folder 1050 thereby releasably joining a plurality of portions of the rear surface. Either of the previously described in-line methods may further include the step of printing at least one color on a portion of the front surface or the rear surface of the web of substrate, or both, prior to applying the strip of release coating. In further embodiments, the high speed in-line manufacturing method shown in FIG. 6 may be a part of a production line for a magazine or similar printed publication, in which individual label sheets 50 are meant to be inserted as bound-in, adhered-in, or blown-in inserts. Additionally, the previously described in-line methods may further include the step of introducing at least one score line into the substrate across the grain of the substrate.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

The corresponding structures, materials, acts, and equivalents of all means or step plus function elements in the claims below are intended to include any structure, material, or acts for performing the functions in combination with other claimed elements as specifically claimed.

We claim:

1. A curl resistant single substrate label sheet for use with conventional printers, comprising:

at least one body portion, having a front surface and a rear surface, made of a substrate;

at least one label portion, having a front surface and a rear surface, made of the substrate and contiguous with the body portion, having at least one adhesive applied to at least one portion of the rear surface, and having at least one label formed in the label portion;

at least one release liner, having a front surface and a rear surface, made of the substrate having at least one release coating on at least one portion of the from surface, and releasably bonded to the label portion by the at least one adhesive; and wherein the sheet has a plurality of edges including at least a top edge, a bottom edge, a left edge, and a right edge, and includes at least one score line provided across the grain of the substrate and extending from the bottom edge into the at least one body portion by a length of less than 50% of the left edge of the sheet, the score line compresses the grain to increase rigidity and curl resistance of the label sheet.

2. The curl resistant single substrate label sheet of claim 1, wherein the at least one label extends to at least one of the plurality of edges.

3. The curl resistant single substrate label sheet of claim 1, wherein the at least one label portion is bounded on three sides by the top edge, the left edge, and the right edge, and substantially all of the label portion is formed into the at least one label.

4. The curl resistant single substrate label sheet of claim 1, wherein the at least one label portion is bounded on three sides by the top edge, the left edge, and the right edge, and the at least one adhesive and the at least release coating extend substantially to at least one of the plurality of edges.

5. The curl resistant single substrate label sheet of claim 1, further including printed indicia on at least a portion of the at least one body portion front and rear surfaces, at least a portion of the at least one label portion front surface, and at least a portion of the at least one release liner rear surface.

6. The curl resistant single substrate label sheet of claim 5, further including printed indicia on at least a portion of the at least one label portion rear surface, and at least a portion of the at least one release liner front surface.

7. The curl resistant single substrate label sheet of claim 1, further including at least one remoist area.

8. The curl resistant single substrate label sheet of claim 1, further including at least one removable foil area.

9. The curl resistant single substrate label sheet of claim 1, further including at least one line of perforation.

10. The curl resistant single substrate label sheet of claim 1, wherein the at least one body portion is formed with at least one fold line.

11. The curl resistant single substrate label sheet of claim 1, wherein the at least one body portion is formed with at least one viewing window.

12. The curl resistant single substrate label sheet of claim 1, wherein the at least one score line includes a first score line and a second score line where the first score line and the second score are substantially orthogonal to the grain of the substrate, extend substantially orthogonally from the bottom edge into the at least one body portion, and substantially disappear from sight upon exposure to the heat of the conventional printer.

13. The curl resistant single substrate label sheet of claim 1, wherein a length of the at least one score line is less than approximately twenty-five percent of a length of the left edge.

14. A curl resistant single substrate label sheet having a plurality of edges including at least a top edge, a bottom edge, a left edge, and a right edge, for use with conventional printers, comprising:

at least one body portion, having a front surface and a rear surface, made of a substrate;

at least one label portion, having a front surface and a rear surface, made of the substrate and contiguous with the body portion, having at least one adhesive applied to at least one portion of the rear surface, and having at least one label formed in the label portion that extends to at least one of the plurality of edges;

at least one release liner, having a front surface and a rear surface, made of the substrate having at least one release coating on at least one portion of the front surface, and releasably bonded to the label portion by the at least one adhesive; and at least one score line provided across the grain of the substrate and extending from the bottom edge into the at least one body portion by a length of less than 50% of of the left side of the sheet, the score line compresses the grain to increase the rigidity and curl resistance of the label sheet.

15. The curl resistant single substrate label sheet of claim 14, wherein the at least one label portion is bounded on three sides by the top edge, the left edge, and the right edge, and substantially all of the label portion is formed into the at least one label.

16. The curl resistant single substrate label sheet of claim 14, wherein the at least one label portion is bounded on three sides by the top edge, the left edge, and the right edge, and the at least one adhesive and the at least release coating extend substantially to at least one of the plurality of edges.

17. The curl resistant single substrate label sheet of claim 14, further including printed indicia on at least a portion of the at least one body portion front and rear surfaces, at least a portion of the at least one label portion front surface, and at least a portion of the at least one release liner rear surface.

18. The curl resistant single substrate label sheet of claim 17, further including printed indicia on at least a portion of the at least one label portion rear surface, and at least a portion of the at least one release liner front surface.

19. The curl resistant single substrate label sheet of claim 14, further including at least one remoist area.

20. The curl resistant single substrate label sheet of claim 14, further including at least one removable foil area.

21. The curl resistant single substrate label sheet of claim 14, further including at least one line of perforation.

22. The curl resistant single substrate label sheet of claim 14, wherein the at least one body portion is formed with at least one fold line.

23. The curl resistant single substrate label sheet of claim 14, wherein the at least one body portion is formed with at least one viewing window.

24. The curl resistant single substrate label sheet of claim 14, wherein the at least one score line includes a first score line and a second score line where the first score line and the second score are substantially orthogonal to the grain of the substrate, extend substantially orthogonally from the bottom edge into the at least one body portion, and substantially disappear from sight upon exposure to the heat of the conventional printer.

* * * * *